(12) United States Patent
Adams et al.

(10) Patent No.: US 9,130,848 B2
(45) Date of Patent: Sep. 8, 2015

(54) METHOD AND APPARATUS FOR ENHANCING QOS DURING HOME NETWORK REMOTE ACCESS

(75) Inventors: Corey F. Adams, Frisco, TX (US); Michael J. Brehm, Allen, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 336 days.

(21) Appl. No.: 13/075,920

(22) Filed: Mar. 30, 2011

(65) Prior Publication Data

US 2012/0254427 A1  Oct. 4, 2012

(51) Int. Cl.
| | |
|---|---|
| *G06F 15/16* | (2006.01) |
| *H04L 12/24* | (2006.01) |
| *H04L 12/28* | (2006.01) |
| *H04L 12/923* | (2013.01) |
| *H04L 12/927* | (2013.01) |
| *H04L 29/08* | (2006.01) |
| *H04W 28/16* | (2009.01) |

(52) U.S. Cl.
CPC ........ *H04L 41/0896* (2013.01); *H04L 12/2823* (2013.01); *H04L 12/2834* (2013.01); *H04L 47/762* (2013.01); *H04L 47/803* (2013.01); *H04L 67/322* (2013.01); *H04L 2012/2841* (2013.01); *H04W 28/16* (2013.01)

(58) Field of Classification Search
CPC .................................................. H04L 67/322
USPC ................................................... 709/223, 225
See application file for complete search history.

(56) References Cited

U.S. PATENT DOCUMENTS

| | | | |
|---|---|---|---|
| 6,957,071 B1 * | 10/2005 | Holur et al. ................ 455/452.2 |
| 7,778,220 B2 * | 8/2010 | Sastry ............................ 370/329 |
| 2007/0047507 A1 | 3/2007 | Nakatsugawa et al. | |
| 2008/0117869 A1 | 5/2008 | Freen et al. | |

* cited by examiner

*Primary Examiner* — Adnan Mirza
(74) *Attorney, Agent, or Firm* — Stephen J. Wyse (57) ABSTRACT

A manner of enhancing QoS when facilitating remote access to a home network. An HA in the home network is provided with QoS parameters, for example when registering with an SG (signaling gateway), which parameters include a bandwidth allocation for communications via a network. These parameters may be dictated, for example, but an OSS/BSS associated with the network. The HA then determines the bandwidth requirement for each application request it receives, and compares it with the bandwidth allocation of the QoS parameters. Execution of applications that do not exceed the bandwidth allocation is permitted, while execution of others are rejected, at least until agreement to proceed at a lower bandwidth is obtained or currently executing applications are re-prioritized. The bandwidth allocation may be adjusted while applications are executing so that available bandwidth may be used to determine how to respond to future application requests.

10 Claims, 5 Drawing Sheets

METHOD AND APPARATUS FOR ENHANCING QOS DURING HOME NETWORK REMOTE ACCESS

CROSS-REFERENCE TO RELATED APPLICATIONS

The present invention is related to the U.S. patent application Ser. No. 12/985,730, entitled Method and Apparatus for Home Network Access, filed on 6 Jan. 2011, and U.S. patent application Ser. No. 12/986,706, entitled Method and Apparatus for Home Network Access Using a Remote Mobile Device, filed on 7 Jan. 2011. The entire contents of these Applications are incorporated by reference herein.

TECHNICAL FIELD

The present invention relates generally to the field of communication networks, and, more particularly, to a method and apparatus for enhancing QoS while facilitating remote access by a subscriber or trusted agent to an in-home communication network.

BACKGROUND

Introductory information will here be provided. Note, however, that the apparatus, techniques, or schemes described herein as existing or possible are presented only as background for describing the present invention, and no admission is intended thereby that these were heretofore commercialized or known to others beside the inventors.

Selected abbreviations are herewith defined, at least some of which are referred to within the following description of the state-of-the-art and the present invention.
ASIC Application Specific Integrated Circuit
BSS Business Support Systems
DHCP Dynamic Host Configuration Protocol
DSL Digital Subscriber Line
DVR Digital Video Recorder
HA Home Agent
FA Foreign Agent
IEEE Institute of Electrical and Electronics Engineers
IP Internet Protocol
ISP Internet Service Provider
NAT Network Address Translation
OS Operating System
OSS Operations Support Systems
PC Personal Computer
PKI Public Key Infrastructure
PS Proxy Server
RG Residential Gateway
SG Signaling Gateway
QoS Quality of Service
TCP Transmission Control Protocol
TMA Trusted Monitoring Agent
UID Unique Identifier Consumer electronics have progressed a great deal in the recent past. Not only are they more capable than they were a short time ago, they are also far more prevalent. Many homes, for example, have more than one personal computer and video storage device, along with many similar devices. These devices are often connected together to form a network, and through the network are capable of communicating with other devices outside of the home. The use of email and telephone services that are available through such networks is very common, and the downloading of, for example, software applications and multimedia transmissions is becoming more frequent.

A home network benefits users in a number of ways. Even if there is no connection to others outside of the home, the home network allows a user to, for example, print from a printer that is not connected directly to the computer in use. Files such as documents, pictures, and videos may be retrieved or sent to another device within the home. Modern data storage units are capable of saving a large amount of audio or video data, and the network permits this content to be retrieved and played on any device connected to the network. Multiple users may participate in a game over the network.

Connections outside of the home are often facilitated by some type of device that serves as an interface to whatever network service is providing access. Such a device may take the form, for example, of a wireless router connecting multiple computers to the Internet, or a set-top box that receives video and television programming for display on a television or other video display device. Many if not most home networks are connected to an access network, which provides a link between a subscriber's home and a core network capable of handling large amounts of communication traffic and providing gateways for communicating through other networks as well.

When the home network is connected to an access network, communications such as email and Internet access are permitted; video and audio content may be downloaded. In addition, recent advances in technology have enlarged the amount of data that may be uploaded, or sent from the home network to others through the access network. In some cases, for example a movie or other video may be sent to another at nearly the speed at which it was downloaded, at least from the user's perception.

This may be of great advantage to the user of a mobile device. As used herein, a mobile device is one capable of accessing a mobile network using radio communications. Mobile devices are very popular because of their mobility; a user may conveniently carry the device with them and use it anywhere a mobile network may be contacted. Mobile network providers have signed up thousands of subscribers and built up networks that cover large geographic areas. In many locations, if a subscriber cannot access their own mobile network, they may use another network as a visitor. Mobile networks are often based on a cell system, where mobile devices communicate with a nearby base station and handover protocols allow them to travel from one cell (base station) to another without significant interruption of an on-going communication session.

A mobile subscriber at home may be able to access content and devices that are part of the home network, for example using a short range radio protocol such as Bluetooth. When the user is not at home, however, such access is not available, but the content may be accessible in a number of other ways. For example, content accessible via the home network may not actually be stored there, but is instead stored in a remote memory device maintained by a vendor. In other cases the content may be stored within the home network, but is copied or mirrored at a vendor's server for the purpose of providing mobile access. In either case, the user may access the content being stored by the vendor using a mobile device communicating though a mobile network.

There are disadvantages with this strategy, however. For one, storage on a vendor site may raise security concerns. In addition, the vendor may charge for the service and there is a risk that they may at some point become unavailable if their business fails. Finally, the sheer volume of content that users currently want to, and are projected to demand, may make this option less than viable in the future.

Access may also be possible directly to the home network though a mobile network using protocols such as MobileIP. In such an arrangement it is contemplated that the mobile device embodies a foreign agent (FA) that establishes a communication session with a home agent (HA) embodied on one of the devices that makes up the home network. Although this addresses some of the disadvantages associated with third party vendors, several disadvantages remain.

First, to communicate with the FA, the HA obtains an IP address. In general practice, however, this IP address will be dynamically assigned, meaning that he address is not assigned permanently but will eventually be re-assigned to another user. Of course, the HA can request another IP address, but when assigned it will almost certainly be different than the previous one. While the policy of dynamically assigning IP addresses conserves IP addresses and reduces the number ultimately required, it can disrupt routing between the FA and the HA and make it more difficult for the mobile device to register with its respective HA.

In addition, home networks frequently employ a residential gateway, with the HA being assigned a private IP address and being behind a NAT boundary. This also may help to conserve IP addresses, but may make it difficult for the FA to contact the HA and set up a secure tunnel for communications.

Similar disadvantages may hinder access by a TMA (trusted monitoring agent), typically operated by a TMA service. The TMA service may, for example, monitor home security devices or medical monitoring equipment by remotely accessing these devices via an in-home network.

Solutions for overcoming these disadvantages are presented in U.S. patent application Ser. Nos. 12/985,730 and 12/986,706, referred to above, but there also remains the problem of ensuring quality service over the network. As should be apparent, network communications are no longer limited to voice and simple data transmission. The proliferations of feature-rich mobile devices, for example, and of the bandwidth-intensive applications that run on them have greatly increased the burden on the network. QoS (quality of service) may suffer as a result.

In the face of such difficulties, there is a need for a manner of facilitating secure access to a home network from a remote mobile station while promoting adequate QoS levels network-wide. Accordingly, there has been and still is a need to address the aforementioned shortcomings and other shortcomings associated with communications between a FA embodied in a mobile or similar device and an HA in a home network. These needs and other needs are satisfied by the present invention.

SUMMARY

The present invention is directed to a manner of enhancing QoS while facilitating access to a home network by a mobile device. In one aspect, the invention is a method of providing remote access to a home network having a HA (home agent), including receiving an application request in the HA, determining the bandwidth requirements for executing the application, determining whether the application bandwidth requirements exceed the bandwidth allocation of the QoS parameters, if any, and permitting execution of the application if the application bandwidth requirements do not exceed the bandwidth allocation of the QoS parameters. The QoS parameters may be stored at the HA or in another device in the home network, and obtained when the HA is initially started up, or upon registration with an SG (signaling gateway).

The method may further include rejecting execution of the application if the application bandwidth requirements exceed the bandwidth allocation of the QoS parameters, or, prior to rejecting execution of the application, determining whether another currently executing application may be re-prioritized. If the requested application is determined to be or made a higher priority, then a currently pending application maybe cancelled, delayed, or not executed, or executed only at a lower bandwidth. When an application is executed, the method may include adjusting the bandwidth allocation of the QoS parameters, which may be re-adjusted when execution of the application is terminated. The HA may in some cases requested that the QoS parameters be changed to allocate additional bandwidth, perhaps at a different billing rate. In some embodiments, only application requests are processed in this manner, and the HA initially examines each request to determine if it is an application request.

The method may further include transmitting a notification message if it is determined that the application bandwidth requirements exceed the bandwidth allocation of the QoS parameters, transmitting a notification message, for example to the SG, and the notification may contain an indication the rejected maybe executed if a lower bandwidth is acceptable. In some embodiments, a positive response to such a notification may permit the application to be executed without further consideration.

In another aspect, the present invention is software instructions stored in one or more tangible, non-transitory memory devices for performing any or all of the above operations when executed on a special purpose processor on a computing device such as an HA or RG (residential gateway).

In another aspect, the present invention is an HA for enhancing QoS while facilitating remote access to a home network, including a processor, a memory device accessible to the processor, wherein the memory device includes a location for maintaining QoS parameters, an application bandwidth determiner for determining the bandwidth requirement associated with an application request, and a QoS parameter comparator for comparing the application bandwidth requirement to a bandwidth allocation of the QoS parameters to determine of the requested application can be permitted. The HA may also include a QoS adjuster for adjusting the bandwidth allocation to account for permitted application execution and termination.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
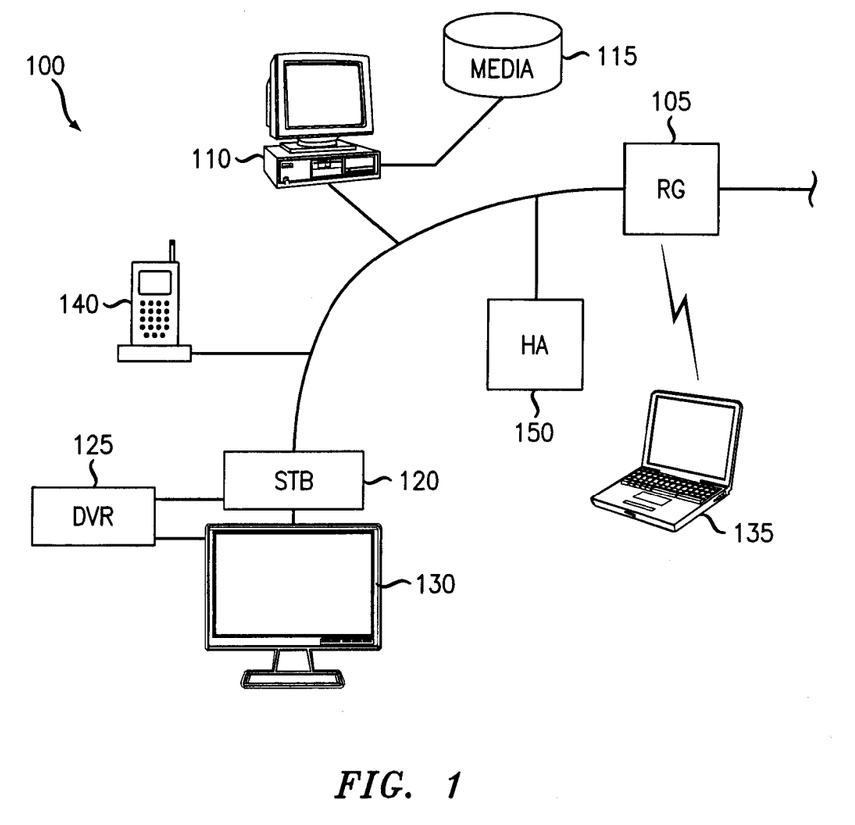
FIG. 1 is a simplified schematic diagram illustrating selected components of a home network according to an embodiment of the invention.

The present invention is directed to a manner of extending a home network to a remote mobile device, and is of particular advantage when implemented in an environment where communication with the home network is limited by a dynamic connection point to the Internet and a NAT (network address translation) boundary. FIG. 1 is a simplified schematic diagram illustrating selected components of a home network 100 according to an embodiment of the invention. Note that the home network is so-called because the components used are suitable to acquisition and use in-home by a subscriber, but the same system could just as easily be installed in, for example, a small business, school, or church office setting. For convenience, such a network will be referred to as a home network regardless of whether it is installed in the residence of a single subscriber or in another location.

The various components of a home network could communicate only among themselves—within the home (or other installed location), but this is typically not the case. Communication with outside devices is often one of the reasons for which the home network was established. In the embodiment of FIG. 1, home network 100 includes an RG (residential gateway) 105. RG 105 facilitates communications between home network 100 and an access network (not shown in FIG. 1). The access network in turn provides a conduit to a core communication network and then to other networks and devices (see, for example, FIG. 2).

In the embodiment of FIG. 1, RG 105 may also act as a router to receive communications from outside and transmit them to the various components of network 100. In this embodiment, these components include a PC 110 and associated media storage device 115. Telephone service is also available through home network 100, as represented by telephone 140. A set-top box 120 is also part of home network 100 and is associated with DVR 125. In this embodiment, network 100 also includes a telephone 130 and laptop computer 135. As indicated in FIG. 1, many components of network 100 are connected by a cable to RG 105, while the laptop 135 uses a wireless interface. Of course, this particular combination of components, while not uncommon, is exemplary and other home networks may be configured differently.

In accordance with the present invention, home network 100 also includes an HA (home agent) 150, which has several functions that will be described herein. HA 150 is typically implemented as a physical processor executing instructions stored as software in a non-transitory medium. In other embodiments, the HA may be implemented as a combination of executable software and hardware such as an ASIC. The HA may be a standalone device or incorporated in a multifunction apparatus that performs other duties as well. In some implementations it may, for example, be implemented in RG 105 or PC 110.

In accordance with some embodiments of the present invention, the HA 150 acquires a UID (unique identifier) that may be used for communications sessions involving FAs or TMAs authorized to access the home network. There are several ways in which this acquisition could be made; in one embodiment the HA simply generates its own UID, for example using the serial number of the processor. In another embodiment, the HA uses a UID maintained in the OS (operating system). In either case, the UID acquisition scheme should insure the uniqueness of the UID. The UID may also be generated by another element, for example, one could be assigned when registering with an SG (signaling gateway; see for example FIG. 2). If generated by another element, the HA would preferably store it in encrypted form in an accessible memory device.

Figure 2:
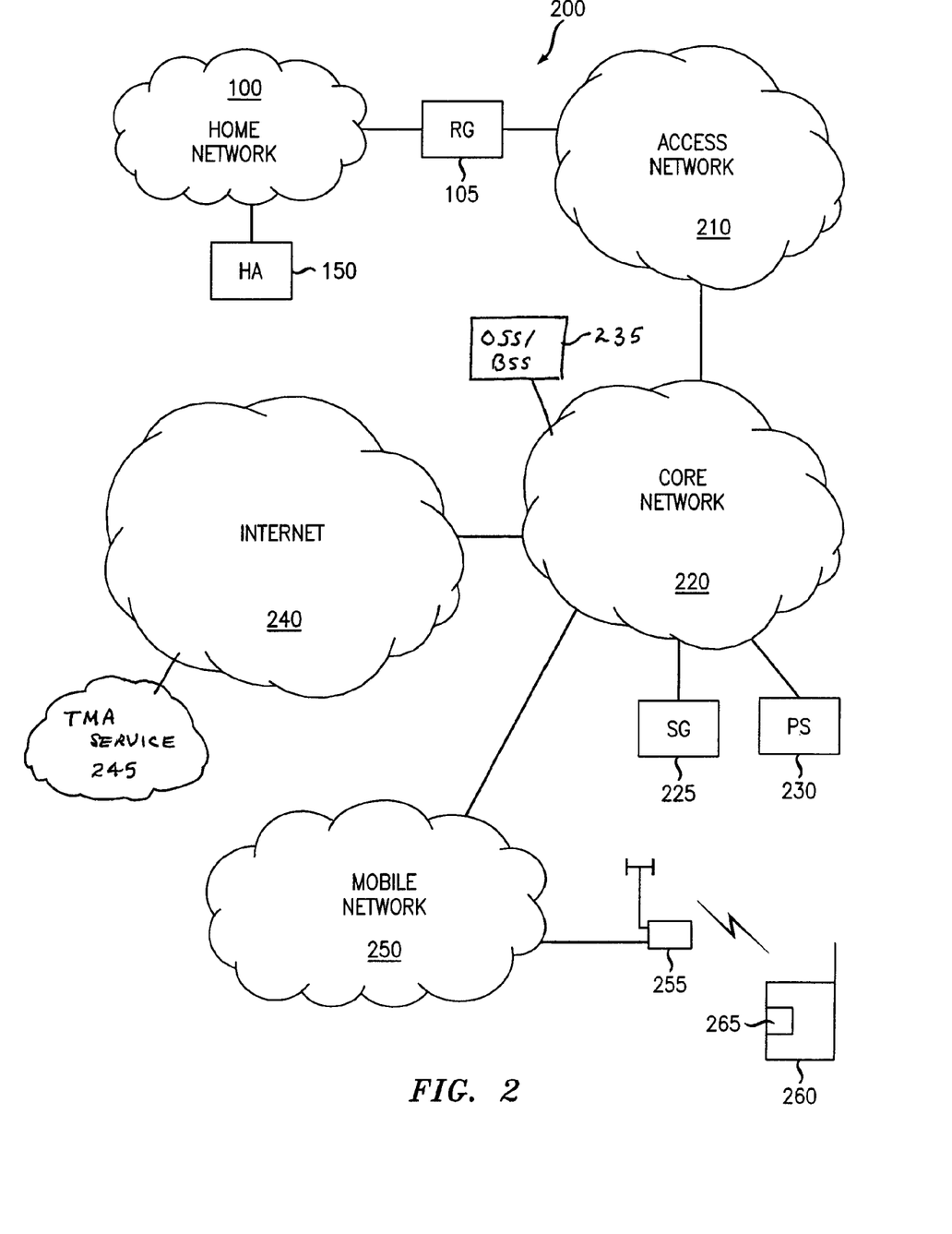
FIG. 2 is a simplified schematic diagram illustrating selected components of a communication network according to an embodiment of the present invention.

FIG. 2 is a simplified schematic diagram illustrating selected components of a communication network 200 according to an embodiment of the present invention. Note that communication network 200 actually includes several networks (or, more accurately, components within those networks, which components are not shown separately). For example, home network 100 is illustrated as a cloud (though shown in more detail in FIG. 1), except that HA 150 is also depicted in FIG. 2, as is RG 105. RG 105 connects the home network 100 to access network 210. Access network may, for example, be a DSL implementation in a PSTN or a PON (passive optical network). Access network 210 in turns provides a connection to core network 220. In general, core network 220 is a large capacity packet data network that routes communications between many different entities, including home network 100 via access network 210.

In this embodiment, for example, the core network 220 is in communication with the Internet 240, providing home network 100 with Internet access. Again, there may be one or more gateway devices used at the interface, though for simplicity these components are not shown individually in FIG. 2. Separately shown, however, are signaling gateway (SG) 225 and proxy server (PS) 230. Each (or both) of these devices could be software executing on a single physical hardware unit or could be implemented using multiple physical devices working cooperatively.

An OSS/BSS (operations support system/business support system) is also illustrated separately in FIG. 2. The OSS/BSS is a network control system that may perform several functions, including maintenance, configuration and fault management, as well supporting subscription and billing services. The processes and apparatus of the present invention interact with the OSS/BSS in at least some embodiments.

In the embodiment of FIG. 2, core network 220 is also connected to mobile network 250. Mobile network 250 typically includes a number of geographically dispersed base stations, each with their own antenna, for communicating with mobile devices in their local area. Antenna/base station 255 is depicted for purposes of illustration. Antenna/base station 255 may include, for example, an eNodeB. Mobile device 260 is also shown and is capable of radio communications with antenna/base station 255 to set up a communication session through mobile network 250. Although only one is shown, a mobile network ordinarily includes a large number of antenna/base stations and employs a protocol for handing over a communication session from one antenna/base station to another when the mobile device relocates.

In this embodiment of the present invention, mobile device 260 includes a FA (foreign agent) 265, which may register with HA 150 in order to access home network 100. In accordance with the present invention a secure communication path, or tunnel, is established between FA 265 of mobile device 260 and HA 150 of home network 100 though SG 225 or PS 230. An example of this process is described in U.S. patent application Ser. No. 12/985,730, referred to above. A similar process may be used in registering and communicating with a TMA (trusted monitoring agent) operated by a TMA service. TMA service 245 is also depicted in FIG. 2, in this embodiment accessible via Internet 240.

Figure 3:
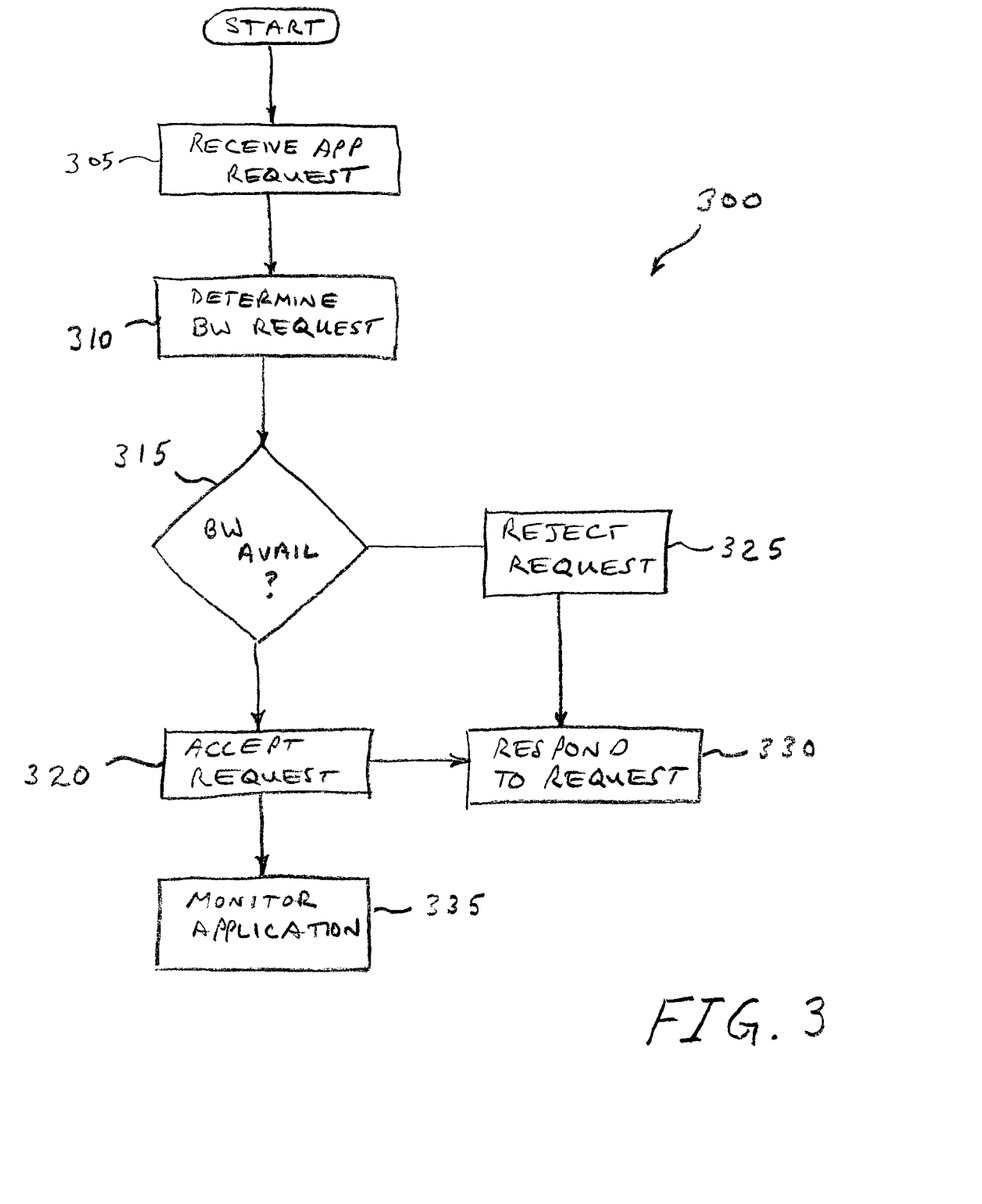
FIG. 3 is a flow diagram illustrating a method according to an embodiment of the present invention.

FIG. 3 is a flow diagram illustrating a method 300 of providing access to a home network according to an embodiment of the present invention. At START it is presumed that the components necessary to performing the method are available and operational according to the present invention. The process then begins when an HA of the home network receives an application request (step 305). As used herein, an application request is one involving a transfer of some form of content or substantial data transfer as opposed to command and control messages or heartbeat transmissions, although the categorization of such messages may vary by implemtation. Messages of the latter type tend to be small and transitory, and do not consume substantial network resources. Although the process of method 300 could be applied to them as well, in this embodiment this is not the case.

In the embodiment of FIG. 3, the HA then determines the bandwidth requirement of the requested application (step 310). For example, if an FA has requested streaming video from a video storage device of the home network, an approximation is made of the bandwidth required to for the transmission. Note that in the embodiment of FIG. 3, this is substantially the bandwidth required for the upstream transmission, though anticipated downstream transmission may be considered as well.

In this embodiment, a determination is then made (step 315) as to whether sufficient bandwidth is available. This determination is typically made in the HA itself, although this is not necessarily the case. If the bandwidth is available, then the application request is accepted (step 320), and execution of the application may begin, either immediately or at such time as specified in the request. If, on other hand, the bandwidth is not available, then the application request is rejected (step 325). In either case, a response to the application request is generated and transmitted (step 330), typically to the requesting entity. The application is then monitored (step 335), so that the HA is aware of which processed are being executed, which are anticipated, and which have been competed or otherwise terminated. As should be apparent, this information may be used when and if additional application requests are received (not shown).

Figure 4:
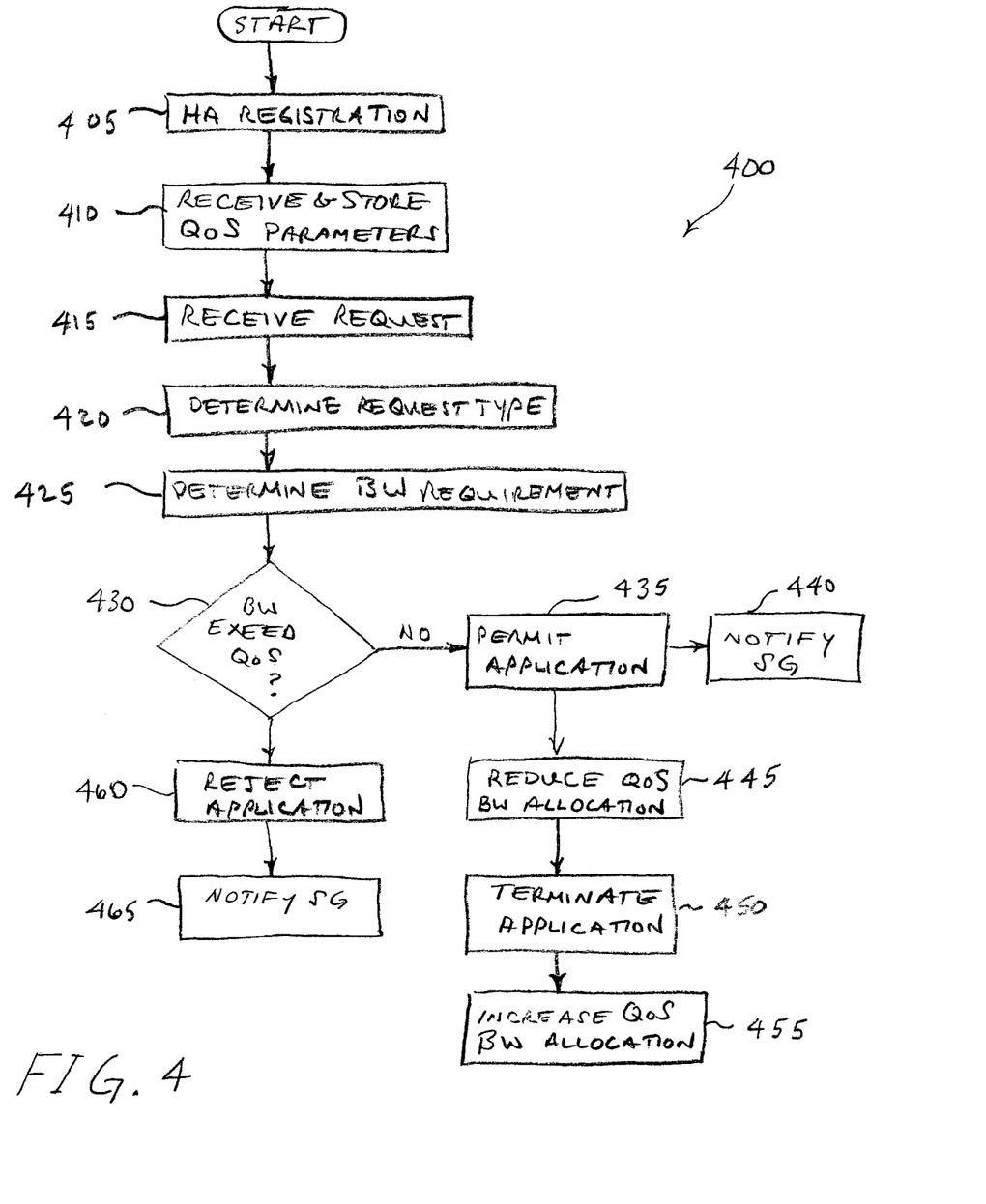
FIG. 4 is a flow diagram illustrating a method according to an embodiment of the present invention.

FIG. 4 is a flow diagram illustrating a method 400 of providing access to a home network according to an embodiment of the present invention. At START it is presumed that the components necessary to performing the method are available and operational according to the present invention. Note that the method 400 is in some way analogous but not identical to the method 300 illustrated in FIG. 3. They are separate embodiments, however, and no implication is intended that process steps or operations are to be inserted into or removed from one process based only on their appearance or omission in the other.

In the embodiment of FIG. 4, the process 400 then begins when an HA registers (405) with an SG (signaling gateway) associated with a communication network. In accordance with the present invention, the HA at that time may receive a UID (not shown) for use in setting up communications with remote agents such as an FA or TMA. In this embodiment, however, the HA at registration receives and stores QoS parameters from the SG (step 410). The QoS parameters indicate at least the allowable network bandwidth, which typically reflects the uplink bandwidth because that is often the significant bandwidth requirement, but in some implementations the HA may receive and store separate downlink criteria as well.

In the embodiment of FIG. 4, when the HA receives a request from a remote device (step 415), it first determines the nature of the request (step 420), that is, whether it is likely to be a bandwidth intensive. Requests for access to the home network are typically not bandwidth-intensive and in most implementations will not be processed according to methods 300 or 400. Note, however, that such requests are, however, handled according to whatever security measures are in place, for example those associated with a request for access may be handled in accordance with U.S. patent application Ser. No. 12/985,730. Note also that the exact classification of individual request messages will be performed according to rules established for each implementation. In other words, step 420 performs a filtering operation to determine which requests or messages will proceed to the next step. For convenience, all such requests will be referred to as application requests. Others will still be processed normally.

In this embodiment, application requests are then examined to determine (step 425) their bandwidth requirement. This may be a requirement specified in the request itself, one determined by another network (home or otherwise) element, or one calculated by the HA after examining the request. Again, the bandwidth requirement is in most implementations the uplink bandwidth necessary to respond satisfactorily to the request. Note that in accordance with the present invention, no level of precision is required, though obviously it is of advantage to determine the bandwidth needed for a particular application as accurately as possible. This application bandwidth requirement determined at step 425 may then be transmitted to the SG (and from there to the FA or TMA), although this is optional and somewhat dependent on the role these other devises will play in the QoS assurance process.

In the embodiment of FIG. 4, the HA then compares (step 430) the determined application bandwidth requirement to the bandwidth allocation of the QoS parameters, if any, stored at the HA device or accessible to it. As mentioned above, the HA may be a standalone device or it may be incorporated into another home network device, such as the RG. The storage device for storing the QoS parameters may by the same token be located variously as well. It is preferred, however, that the QoS parameters, if any, be stored in a memory device that is part of the home network.

In the embodiment of FIG. 4, if the application bandwidth requirement does not exceed the bandwidth allocation of the QoS parameters, then execution of the application is permitted (step 435). It is not necessary, however, that the actual execution begin immediately; it may instead begin, for example, at a specified time or upon receipt of a pre-arranged signal from the network or from the request FA or TMA. If the application execution is permitted, a notification message is preferably transmitted to the SG (step 440). In addition, the application allocation is reduced (step 445) by the amount of the application bandwidth requirement until execution of the application has been completed (step 450). In this way the allocated bandwidth is not exceeded by permitting multiple applications that each themselves do not exceed the bandwidth allocation.

Preferably, the value of the original bandwidth allocation is recorded, as is the application bandwidth requirement of all permitted applications that have not completed execution. If a new bandwidth allocation is received, for example due to changing network conditions, then the available allocated bandwidth may be re-calculated. In other embodiments, the available allocated bandwidth may be recalculated every time that an application request is received.

Returning to the embodiment of FIG. 4, if the application bandwidth requirement is determined to exceed the allocated bandwidth of the QoS parameters, then the application is rejected (step 460). When an application is rejected, of course, execution does not begin, but preferably a notification message is transmitted (step 465). In most implementations, the message is sent from the HA to the SG and provides a reason for the rejection. In this embodiment, the message may also include an indication of the available bandwidth allocation or some other value indicating the bandwidth that can be made available for execution of the application. The requesting device then has the opportunity to reply to the rejection notification message in order to request execution of the application at a lower bandwidth requirement. In some embodiments, this reply may be treated as a new application request; in others, execution of the application will be automatically permitted at the reduced bandwidth.

In another embodiment (also not shown), prior to rejecting the application request, the HA first analyzes the currently executing applications to see if the pending application request is a higher priority. A priority rules table may be maintained for this purpose. For example, application requests from TMA services that address security or medical issues may be given higher priority. If necessary, the HA may then interrupt or reject one or more of the currently executing applications, or reduce their bandwidth allocation, to permit execute of the higher priority request.

In the embodiment of FIG. 4, when then execution of an application is complete or has otherwise terminated, the required application bandwidth is added to the bandwidth allocation of the QoS parameters (step 455). If an application was previously rejected, the requesting entity may be notified so that their request may be re-submitted (not shown).

Note that the sequence of operations presented above in reference to FIGS. 3 and 4 are exemplary, and the present invention is not limited to the illustrated embodiments. Additional operations may be added, or in some cases removed, without departing from the spirit of the invention. In additional the operations of the illustrated methods may be performed in any logically-consistent order.

Figure 5:
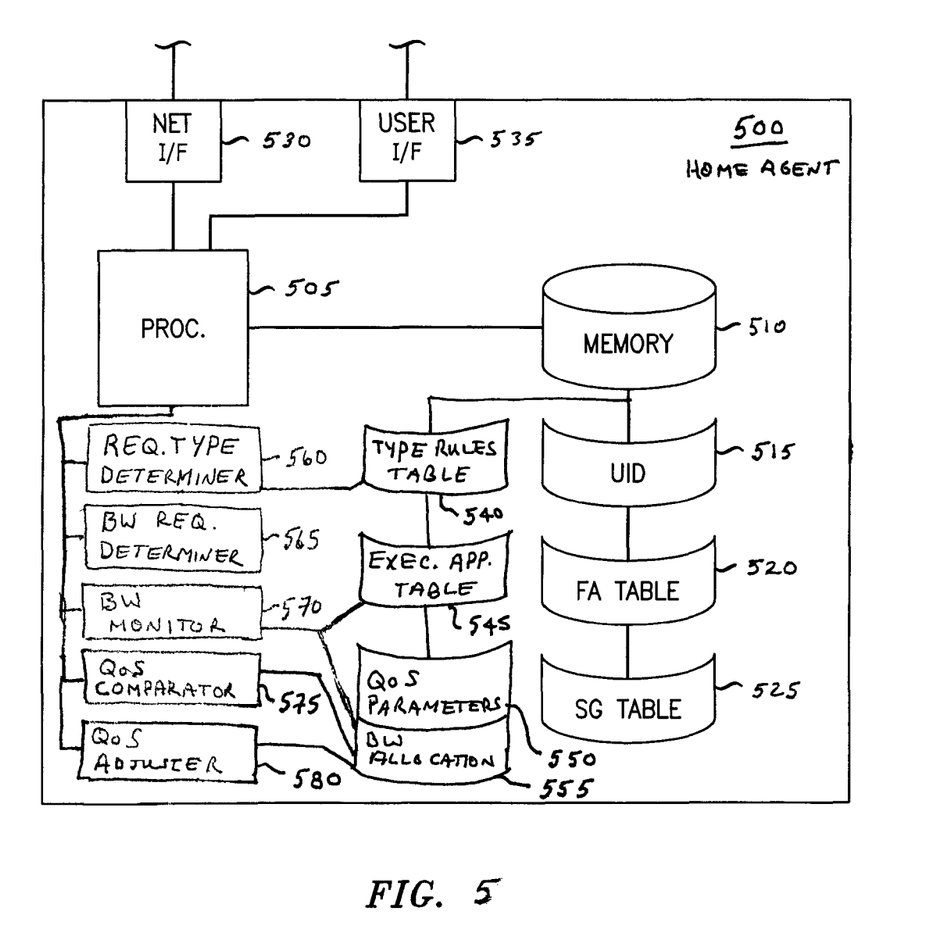
FIG. 5 is a simplified schematic diagram illustrating selected components of an HA according to an embodiment of the present invention.

FIG. 5 is a simplified schematic diagram illustrating selected components of an HA 500 according to an embodiment of the present invention. In this embodiment, the HA 500 includes a processor 505 for controlling the other components of HA 500 and a memory device 510, which stores both data and program instructions for controlling the HA 500. Memory device, as used herein, connotes a physical, non-transitory apparatus. Shown separately is a UID memory device 515 for storing the UID of the HA when it is acquired, preferably in encrypted form. An FA registration table 520 maintains a registry of FAs that have registered with HA 500, including their respective UIDs and authentication certificates. FA registration table 520 may also store access limitations or privileges applicable to each registered FA, if any. An SG table 525 maintains a registry of SG addresses and security information for contacting an SG to register and to set up a secure tunnel for remote mobile device communication sessions when granting remote access.

Also shown separately in the embodiment of FIG. 5 is a message or request type rules table 540 for storing rules used by request type determiner 560 for determining the nature of an incoming request. The QoS processes of the present invention may be applied to certain types in incoming request messages but not other. The rules may be adjusted by, for example, the network operator or OSS/BSS depending on network conditions or other factors. Executing application table 545 keeps track of those applications for which execution has been permitted but has not yet completed or otherwise terminated. Bandwidth monitor 570 monitors the bandwidth usage of these currently executing applications and determines if changes are needed to reduce total bandwidth usage or re-prioritize applications.

In the embodiment of FIG. 5, the QoS parameters 550 includes all parameters used by the HA 500 for managing QoS concerns, including a bandwidth allocation that may indicate, for example, the total bandwidth available for use by the HA 500 and in some cases the bandwidth that should be allocated to certain types of requests or applications. It may also indicate priorities to be used if re-prioritization is undertaken to accommodate certain application requests. QoS parameters are in some implementations received from the SG during the process of registering the HA. These QoS parameters may be determined by the OSS/BSS and are subject to change or updating. QoS comparator 575 compares each application bandwidth requirement as determined by the bandwidth requirement determiner 565 with the QoS parameters 545 to determine if the bandwidth requirement exceeds the available allocated bandwidth 555. QoS adjuster 580 reduces or increases this available allocated bandwidth 555 when an application request is respectively permitted or terminated.

In this embodiment, HA 500 also includes a network interface 530 for interfacing with the home network, and a user interface 535 for interacting with a user making queries and receiving specifications for HA operation. User interface 535 may be connected to, for example, a keyboard and a display screen for this purpose.

Note that HA 500 is an exemplary embodiment and other embodiments of the present invention are possible. For example, some of the components of HA 500 may be combined together in other embodiments, or further subdivided if appropriate. In addition, HA 500 may be implemented in a standalone physical device or incorporated into one of the other home network elements, for example, PC 110 or RG 105 illustrated in FIG. 1.

In this manner the present invention facilitates remote access by an FA or TMA to a home network using an HA, while still observing QoS parameters. A secure tunnel may be established between the FA and an SG, and linked with a secure tunnel between the HA and the SG if access is permitted. The HA monitors applications being executed and re-prioritizes them if necessary to ensure that QoS parameters are not exceeded. Application requests determined to have a bandwidth requirement that exceeds the QoS band width allocation may be simply rejected, or executed at a lower bandwidth.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method of providing remote access to a home network, said method comprising:
    registering an HA (home agent) of the home network with an SG (signaling gateway), wherein registering includes setting up a secure communication tunnel and receiving QoS (quality of service) parameters;
    receiving an application request in an RG (residential gateway);
    providing the request to an HA;
    determining, by the home agent, the bandwidth requirements for executing the application;
    determining whether the application bandwidth requirements exceed the bandwidth allocation of the QoS parameters;

permitting execution of the application if the application bandwidth requirements do not exceed the bandwidth allocation of the QoS parameters; and reducing the bandwidth allocation of the stored QoS parameters by the application bandwidth requirement for each application that has been given permission to execute through the HA but has not yet completed execution.

2. The method of claim 1, further comprising rejecting execution of the application if the application bandwidth requirements exceed the bandwidth allocation of the QoS parameters.

3. The method of claim 1, further comprising determining that a request provided to the HA is an application request.

4. The method of claim 1, further comprising reporting the application bandwidth requirements to the SG.

5. The method of claim 1, further comprising, if it is determined that the application bandwidth requirements exceed the bandwidth allocation of the QoS parameters, transmitting a notification message.

6. The method of claim 5, wherein the notification message is transmitted to the SG.

7. The method of claim 5, wherein the notification message comprises an indication of the bandwidth that can be allocated to the application.

8. The method of claim 7, further comprising receiving a second request, the second request including a request to execute the application using the bandwidth indicated in the notification message.

9. The method of claim 1, further comprising reducing the bandwidth allocation of the stored QoS parameters by the application bandwidth requirement for each application that is executing through the HA.

10. The method of claim 1, further comprising detecting in the HA that execution of an application has finished, and increasing the bandwidth allocation of the QoS parameters by the application bandwidth requirement.

\* \* \* \* \*